US012789860B2

(12) United States Patent
Gao et al.

(10) Patent No.: US 12,789,860 B2
(45) Date of Patent: Nov. 10, 2026

(54) VEHICLE CONTROL METHOD, APPARATUS AND VEHICLE

(71) Applicant: BYD COMPANY LIMITED, Shenzhen (CN)

(72) Inventors: Chunli Gao, Shenzhen (CN); Dongsheng Yang, Shenzhen (CN); Ke Liu, Shenzhen (CN); Huan Wang, Shenzhen (CN); Wei Hou, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 19/078,669

(22) Filed: Mar. 13, 2025

(65) Prior Publication Data

US 2025/0206356 A1 Jun. 26, 2025

Related U.S. Application Data

(63) Continuation of application No. PCT/CN2023/121134, filed on Sep. 25, 2023.

(30) Foreign Application Priority Data

Sep. 27, 2022 (CN) ......................... 202211181969.4

(51) Int. Cl.
*B60W 60/00* (2020.01)
*G06V 20/56* (2022.01)

(52) U.S. Cl.
CPC ......... *B60W 60/005* (2020.02); *G06V 20/588* (2022.01); *B60W 2552/53* (2020.02)

(58) Field of Classification Search
CPC ........... B60W 60/005; B60W 2552/53; B60W 2050/007; B60W 2420/403;
(Continued)

(56) References Cited

U.S. PATENT DOCUMENTS 8,831,813 B1 * 9/2014 Ferguson ............ B60W 30/143 701/28
2015/0321699 A1 * 11/2015 Rebhan ........... B60W 30/18163 701/23

(Continued)

FOREIGN PATENT DOCUMENTS

CN 108545079 A 9/2018
CN 110626349 A * 12/2019 .......... B60W 30/182

(Continued)

OTHER PUBLICATIONS

CN110626349A_Description_20260427_2123.pdf (translation of CN-110626349-A) (Year: 2026).*

(Continued)

*Primary Examiner* — Bao Long T Nguyen
(74) *Attorney, Agent, or Firm* — Wenye Tan

(57) ABSTRACT

A vehicle control method includes obtaining road condition information ahead of a vehicle; controlling, in response to determining, based on the road condition information, that the vehicle has entered a double solid line road section, the vehicle to perform automated driving; and controlling, in response to determining, based on the road condition information, that the vehicle has exited the double solid line road section, the vehicle to exit automated driving.

13 Claims, 2 Drawing Sheets

(58) Field of Classification Search
CPC ..... B60W 30/18163; B60W 2050/146; B60W 2554/402; B60W 2554/4041; B60W 2556/40; B60W 2556/50; B60W 50/14; B60W 60/0051; B60W 60/0053; B60W 2554/4042; B60W 2554/406; B60W 40/06; B60W 50/0098; B60W 60/00133; B60W 60/001; B60W 30/12; B60W 60/0015; B60W 60/007; G06V 20/588; G08G 1/00; G08G 1/09; G08G 1/0962; G08G 1/0967; G08G 1/0968; G08G 1/0969; G08G 1/167
See application file for complete search history.

(56) References Cited

U.S. PATENT DOCUMENTS

| | | | |
|---|---|---|---|
| 2017/0082452 | A1 | 3/2017 | Sumizawa |
| 2017/0248957 | A1* | 8/2017 | Delp ............... B60W 30/18009 |
| 2018/0074492 | A1 | 3/2018 | Yamamoto et al. |
| 2018/0120844 | A1 | 5/2018 | Okamoto et al. |
| 2018/0251155 | A1 | 9/2018 | Chan |
| 2022/0204027 | A1 | 6/2022 | Hitakatsu |

FOREIGN PATENT DOCUMENTS

| | | | |
|---|---|---|---|
| CN | 111605555 | A | 9/2020 |
| CN | 111717198 | A | 9/2020 |
| CN | 111867910 | A | 10/2020 |
| CN | 113370993 | A | 9/2021 |
| CN | 113494921 | A | 10/2021 |
| CN | 114212080 | A | 3/2022 |
| CN | 114373169 | A | 4/2022 |
| CN | 114537437 | A | 5/2022 |
| JP | 2004206275 | A | 7/2004 |

OTHER PUBLICATIONS

The World Intellectual Property Organization (WIPO) International Search Report for PCT/CN2023/121134 Dec. 6, 2023 8 Pages (including translation).

* cited by examiner

VEHICLE CONTROL METHOD, APPARATUS AND VEHICLE

CROSS-REFERENCE TO RELATED APPLICATIONS

The present application is a continuation application of PCT application No. PCT/CN2023/121134, filed on Sep. 25, 2023, which claims priority to Chinese Patent Application No. 202211181969.4, entitled "VEHICLE CONTROL METHOD, APPARATUS AND VEHICLE" and filed on Sep. 27, 2022, content of all of which is incorporated herein by reference in its entirety.

FIELD

The present disclosure relates to the field of vehicle intelligent control technologies, and in particular, to a vehicle control method and apparatus and a vehicle.

BACKGROUND

Currently, implementation of automated driving relies on a high-precision map and a navigation system, which require a user to manually set a start point, an end point, and the like, to plan an entire path, and then perform an automated driving operation throughout the selected path. Such implementation is often complicated, which is likely to bring inconvenience to the user.

SUMMARY

Examples of the present disclosure provide a vehicle control method and apparatus and a vehicle, to solve a problem that current automated driving requires a user to perform route planning in advance, which is likely to bring inconvenience to the user.

According to a first aspect, an example of the present disclosure provides a vehicle control method, including the following steps. Road condition information ahead of a vehicle is obtained. When it is determined, based on the road condition information, that the vehicle has entered a double solid line road section, the vehicle is controlled to perform automated driving. When it is determined, based on the road condition information, that the vehicle has exited the double solid line road section, the vehicle is controlled to exit automated driving.

According to a second aspect, an example of the present disclosure provides a vehicle control apparatus, including: an obtaining module, configured to obtain road condition information ahead of a vehicle; a first control module, configured to control, when determining, based on the road condition information, that the vehicle has entered a double solid line road section, the vehicle to perform automated driving; and a second control module, configured to control, when determining, based on the road condition information, that the vehicle has exited the double solid line road section, the vehicle to exit automated driving.

According to a third aspect, an example of the present disclosure provides an electronic device, including: a processor, a communication interface, a memory, and a communication bus. The processor, the communication interface, and the memory complete communication with each other through the communication bus. The memory is configured to store a computer program. The processor is configured to perform the steps of the vehicle control method according to the first aspect when executing the program stored in the memory.

According to a fourth aspect, an example of the present disclosure provides a computer-readable storage medium, storing a computer program thereon. The steps of the vehicle control method according to the first aspect are implemented when the program is executed by a processor.

According to a fifth aspect, an example of the present disclosure provides a vehicle, including a driving recorder, and further including the vehicle control apparatus according to the second aspect.

According to a sixth aspect, an example of the present disclosure provides a system, configured to implement the vehicle control method according to the first aspect, and including: an input module, a control module, and an execution module. The input module includes a camera, a high-precision map, and a high-precision positioning module. The control module includes an automated driving control unit (ADCU). The ADCU is configured to: obtain road condition information ahead of a vehicle through the camera or the high-precision map and the high-precision positioning module; control, when determining, based on the road condition information, that the vehicle has entered a double solid line road section, the vehicle to perform automated driving; and control, when determining, based on the road condition information, that the vehicle has exited the double solid line road section, the vehicle to exit automated driving. The execution module includes an instrument. The instrument is configured to: provide an activation reminder of the automated driving when the ADCU controls the vehicle to perform automated driving; and provide a closing reminder of the automated driving when the ADCU controls the vehicle to exit automated driving.

In comparison with the related art, the present disclosure has the following advantages.

In examples of the present disclosure, road condition information ahead of a vehicle is obtained; and when it is determined, based on the road condition information, that the vehicle has entered a double solid line road section, the vehicle is controlled to perform automated driving; or when it is determined that the vehicle has exited the double solid line road section, the vehicle is controlled to exit automated driving. In the examples of the present disclosure, it is only necessary to determine, based on the road condition information, that the vehicle has entered the double solid line road section. That is, the vehicle is triggered to perform an automated driving function, and does not rely on setting of a navigation route. A driver is restricted from controlling the vehicle in the double solid line road section, and the vehicle is controlled to start automated driving in this case. This can allow the driver to have a rest while ensuring driving safety. Therefore, the examples of the present disclosure can effectively solve the problem that the current automated driving requires the user to perform route planning in advance, which is likely to bring inconvenience to the user.

The foregoing description is merely an overview of technical solutions of the present disclosure. For clearer understanding of technical means of the present disclosure, it can be implemented based on content of the specification. For clearer understanding of the foregoing and other objectives, features, and advantages of the present disclosure, specific implementations of the present disclosure are exemplified below.

BRIEF DESCRIPTION OF THE DRAWINGS

To describe technical solutions in examples of the present disclosure more clearly, the following briefly introduces the accompanying drawings.

DETAILED DESCRIPTION

The following describes examples of the present disclosure in more detail with reference to accompanying drawings. Although the examples of the present disclosure are shown in the accompanying drawings, it should be understood that the present disclosure may also be implemented in various forms and should not be construed as being limited to the examples described herein. Instead, these examples are provided for the purpose of understanding the present disclosure more thoroughly, and conveying the scope of the present disclosure fully to a person skilled in the art.

Figure 1:
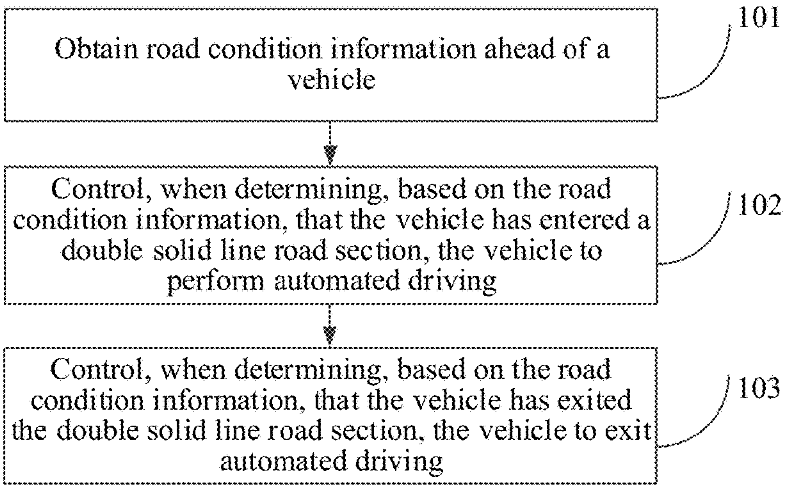
FIG. 1 is a schematic flowchart of a vehicle control method according to an example of the present disclosure.

FIG. 1 is a schematic diagram of a vehicle control method according to an example of the present disclosure, including step 101 to step 103.

The vehicle control method according to this example of the present disclosure is applied to an automated driving control unit (ADCU) of a vehicle. The ADCU is connected to an in-vehicle infotainment (IVI) system. The IVI system includes a display device, a camera, a radar, an audio device, and the like. The vehicle is configured with an in-vehicle wireless communication technology (Vehicle-to-Everything, V2X), a high-precision map, and a positioning system. The display device may be specifically a display screen.

In step 101, road condition information ahead of a vehicle is obtained.

In this step, during traveling of the vehicle, the road condition information ahead of the vehicle is continuously obtained, and the road condition information is used for determining whether the vehicle meets an automated driving trigger condition.

The road condition information may include a lane line condition of a road section ahead, to determine whether the road section ahead is a double solid line road section.

A vehicle control function may be triggered and activated by a user by using a steering wheel button, a voice control application icon, or voice wake-up. When the vehicle control function is not activated, the foregoing step is not performed.

In this example of the present disclosure, when a turn light is not turned on, road condition information straight ahead of the vehicle is directly obtained as the road condition information ahead of the vehicle. When the turn light is turned on, road condition information after the vehicle turns is obtained as the road condition information ahead of the vehicle. That is, when the turn light is turned on, whether there is a solid line road section after turning is identified.

In step 102, when it is determined, based on the road condition information, that the vehicle has entered a double solid line road section, the vehicle is controlled to perform automated driving.

In this step, the double solid line road section refers to a road section in which lane lines on two sides of a lane are solid lines, and because the road condition information includes the lane line condition of the road section ahead, it may be determined, based on the road condition information, whether the vehicle is in the double solid line road section. When it is determined that the vehicle has entered the double solid line road section, the vehicle is triggered to perform an automated driving function. In this case, the vehicle may automatically travel on a selected lane without intervention from a driver.

The driver is restricted from controlling the vehicle in the double solid line road section, and the vehicle is controlled to start automated driving in this case. This can free hands of the driver while ensuring driving safety, allow the driver to have a short rest, and relieve driving fatigue.

During practical application, the double solid line road section may be specifically a long solid line road section such as a tunnel, a ramp, a curve, or a mountain road.

Vehicle automated driving specifically refers to automatic horizontal, longitudinal, and speed adjustment based on a function configured for the vehicle.

In an example, that the vehicle is controlled to perform automated driving specifically includes the following step. The vehicle is controlled to perform vehicle following or cruising. To be specific, when it is determined that the vehicle has entered the double solid line road section, the automated driving is implemented by controlling the vehicle to start vehicle following or cruising based on speed limits of road sections.

In step 103, when it is determined, based on the road condition information, that the vehicle has exited the double solid line road section, the vehicle is controlled to exit automated driving.

When the vehicle has exited the double solid line road section, because a road condition becomes complicated, and the driver is allowed to perform more operations during manual driving, in consideration of safety, the vehicle is controlled to exit the automated driving function and then is manually driven by the driver.

In this example of the present disclosure, it is only necessary to determine, based on the road condition information, that the vehicle has entered the double solid line road section. That is, the vehicle is triggered to perform the automated driving function, and does not rely on setting of a navigation route. The driver is restricted from controlling the vehicle in the double solid line road section, and the vehicle is controlled to start automated driving in this case. This can allow the driver to have a rest while ensuring driving safety. Therefore, this example of the present disclosure can effectively solve a problem that current automated driving requires the user to perform route planning in advance, which is likely to bring inconvenience to the user.

In an example, the foregoing step 101 includes step 111 and step 112.

In step 111, the double solid line road section ahead of the vehicle is determined based on high-precision map information and positioning information when an area ahead of the vehicle is a high-precision map coverage area.

Because the vehicle is configured with a high-precision map and a navigation system, it may be determined, in real time, whether the area ahead of the vehicle is covered by the high-precision map. When the area ahead of the vehicle is the high-precision map coverage area, it is determined, directly based on the high-precision map information fed back by the high-precision map and the positioning information provided by the navigation system, whether there is a double solid line road section ahead of the vehicle.

In step 112, when the area ahead of the vehicle is a non-high-precision map coverage area, the double solid line road section is identified based on a picture of the area ahead of the vehicle captured by a camera.

When the area ahead of the vehicle is the non-high-precision map coverage area, a condition of the road section ahead cannot be obtained based on the high-precision map. However, the condition of the road section ahead may be identified through the camera, specifically, based on the picture of the area ahead of the vehicle captured by the camera. Then, whether there is a double solid line road section in the image is recognized in the image through image recognition, thereby obtaining the condition of the road section ahead.

In this implementation, the double solid line road section in the area ahead of the vehicle is identified based on the high-precision map or information input by the camera, and then, the automated driving is activated when it is determined that the vehicle has entered the double solid line road section, so that implementation of the automated driving function is not limited by the high-precision map coverage area. This can prolong automated driving duration as much as possible while ensuring driving safety, so that the driver can have a rest.

In a specific implementation, that it is determined, based on the road condition information, that the vehicle has entered a double solid line road section includes the following step. When a distance between a start end of the double solid line road section and the vehicle is less than or equal to a first length threshold, it is determined that the vehicle has entered the double solid line road section.

In this specific implementation, the first length threshold is a trigger threshold for determining that the vehicle has entered the double solid line road section, and the first length threshold (Distance_S0) may be set according to an actual situation. When the vehicle travels close to the start end of the double solid line road section, in other words, when it is determined that the vehicle cannot legally change a lane, that is, the double solid line road section that the vehicle has entered is determined, in this case, third prompt information may be triggered to be displayed, to remind the driver that the vehicle is about to start an automated driving module and the automated driving is activated, to help the driver free hands. The third prompt information may be voice information.

In a specific implementation, that it is determined, based on the road condition information, that the vehicle has entered a double solid line road section includes the following step.

When a distance between a termination end of the double solid line road section and the vehicle is less than or equal to a second length threshold, it is determined that the vehicle has exited the double solid line road section.

In this specific implementation, the second length threshold is a trigger threshold for determining that the vehicle has exited the double solid line road section, and the second length threshold (Distance_E0) may be set according to an actual situation. When the vehicle travels close to the termination end of the double solid line road section, and when the vehicle is about to enter a lane changeable road section, it is determined that the vehicle has exited the double solid line road section, thereby exiting automated driving.

In a specific implementation, before that the vehicle is controlled to exit automated driving, the vehicle control method according to this example of the present disclosure further includes the following step.

Second prompt information is displayed. The second prompt information is used for prompting the driver to take over the vehicle.

In this implementation, when it is determined that the vehicle is about to exit the double solid line road section, the second prompt information is displayed, to remind the driver that the vehicle is about to exit the automated driving function and the driver needs to manually take over the vehicle. During practical application, the second prompt information may be voice information.

During practical application, after the second prompt information is displayed, if the driver has not taken over the vehicle within first preset duration, a dangerous driving reminder is provided; and after the second prompt information is displayed, if the driver has not taken over the vehicle within second preset duration, the vehicle is controlled to slow down until the driver takes over the vehicle again or the vehicle stops. The second preset duration is greater than the first preset duration.

In a specific implementation, when the area ahead of the vehicle is the high-precision map coverage area and before it is determined that the distance between the start end of the double solid line road section and the vehicle is less than or equal to the first length threshold, the method further includes step 113 and step 114.

In step 113, a length of the double solid line road section in the area ahead of the vehicle is determined.

In step 114, when the length of the double solid line road section is greater than or equal to a third length threshold, a step of determining that the distance between the start end of the double solid line road section and the vehicle is less than or equal to the first length threshold is performed.

In this implementation, the third length threshold is a length threshold for determining whether or not the length of the double solid line ahead of the vehicle is suitable for the automated driving of the vehicle. The third length threshold may be set by the driver as required.

The vehicle will exit automated driving after exiting the double solid line road section. Therefore, if the vehicle starts automated driving in an excessively short double solid line road section, a case in which the vehicle exits the double solid line road section soon after the vehicle starts automated driving, and the vehicle exits automated driving and the driver is required to take over the vehicle is likely to occur. This not only causes the vehicle to frequently switch between entering an automated driving state and exiting the automated driving state, but also can easily make the driver nervous, which is not conducive to making the driver feel relaxed and relieving driving fatigue.

In this implementation, the double solid line road section ahead of the vehicle needs to be identified, and the length of the double solid line road section is determined based on the high-precision map. It is necessary to further determine whether the vehicle has entered the double solid line road section only when the length of the double solid line road section is greater than or equal to the third length threshold. Further, when it is determined that the vehicle has entered the double solid line road section, the vehicle is triggered to perform automated driving. This can prevent the vehicle from frequently switching between entering the automated driving state and exiting the automated driving state, and making the driver nervous.

In an implementation, the vehicle control method according to this example of the present disclosure further includes step 104 and step 105 before the foregoing step 102.

In step 104, a recommended lane among lanes is determined.

In this step, the recommended lane is a smooth lane, specifically a lane with a fastest traffic speed or an optimal traffic speed, among double solid line lanes in the double solid line road section ahead of the vehicle.

In step 105, first prompt information is displayed. The first prompt information is used for guiding the driver to drive to the recommended lane.

In this step, the first prompt information is displayed, and the driver is effectively reminded to change to a smoother solid line lane. This can prevent the driver from feeling anxious when following behind a slow vehicle and optimize an overall traffic speed.

The first prompt information may be voice information or graphic information. In an example, a reminder for the recommended lane is provided on a display interface of the IVI system. No matter which lane the vehicle is currently on, the system provides guidance.

For example, if a left lane ahead is smoother, a path planning arrow indicates to change to the left lane ahead; if a right lane ahead is smoother, a path planning arrow indicates to change to the right lane ahead; or if a lane straight ahead is smoother, a path planning arrow indicates to go straight, that is, indicates not to perform lane change.

In this example of the present disclosure, the driver may choose to accept the recommended lane or not accept the recommended lane, in other words, the driver may independently choose to manually perform lane change or not to perform lane change, and subsequent activation of the automated driving is not affected. In addition, to ensure safety, the driver may still control the vehicle after the automated driving is activated.

During practical application, a smoothness human machine interface (HMI) is displayed based on traffic speeds of the lanes, to prompt traffic conditions of the lanes. Specifically, the traffic speeds of the lanes may be displayed on an instrument in green, yellow and orange colors from fast to slow.

During practical application, after the recommended lane is determined, the ADCU issues a lane change guidance instruction. If a feedback instruction of the driver for the lane change guidance instruction is received, the vehicle is controlled to automatically change to the recommended lane. If the feedback instruction of the driver for the lane change guidance instruction is not received, a manual driving operation continues to be performed, that is, the driver selects a driving lane. The feedback instruction may be a voice instruction or a turn light turn-on signal consistent with a direction indicated by a lane change indication.

In a specific implementation, the foregoing step 104 includes step 401 to step 403.

In step 401, vehicle types, vehicle speeds, and location information of other vehicles on the lanes ahead of the vehicle are identified.

In step 402, traffic volumes and average passing speeds of the lanes are calculated based on the vehicle speeds and the location information of the other vehicles.

In step 403, the recommended lane among the lanes is determined based on the vehicle types, the traffic volumes, and the average passing speeds.

In this specific implementation, a camera of the ADCU and a radar are combined with V2X, to identify travel-related information of the other vehicles ahead. When the area ahead of the vehicle is the high-precision map coverage area, the camera and the radar are combined with the V2X, the high-precision map information, and the positioning information of the vehicle, to identify the travel-related information of the other vehicles ahead. The travel-related information is vehicle information that affects lane selection by the driver, and may specifically include the vehicle types, the vehicle speeds, the location information, and the like.

In this specific implementation, in consideration that a traveling speed of a special vehicle such as a truck is usually slow, and most people are afraid of such a vehicle, and try to avoid entering a lane that the vehicle is on, after traffic volumes and average passing speeds of lanes are determined, a recommended lane is planned based on vehicle types traveling the lanes. This can take into account concerns of a driver about following different types of vehicles, thereby planning the recommended lane that meets a psychological expectation of the driver.

In a specific implementation, the foregoing step 401 includes step 411 to step 416.

In step 411, recommendation priorities of the lanes are determined based on the traffic volumes and the average passing speeds.

In this step, the recommendation priorities of the lanes are determined according to a rule that a recommendation priority of a lane is higher as a traffic volume is smaller and an average passing speed is faster.

In step 412, a lane with a highest recommendation priority among the lanes is used as an alternative lane.

In this step, based on the recommendation priorities of the lanes, the lane with the highest recommendation priority is first used as the alternative lane.

In step 413, whether a truck exists on the alternative lane is determined based on the vehicle types.

In this step, whether a truck is traveling on the alternative lane of the double solid line road section is determined.

In step 414, when a truck exists on the alternative lane and the truck affects passing of the vehicle through the double solid line road section, a lane corresponding to a next recommendation priority is used as the alternative lane, and a step of determining whether a truck exists on the alternative lane based on the vehicle types is performed.

In this step, when a truck exists on the alternative lane, it is determined, based on location information of the truck and a speed thereof, whether the vehicle will catch up with the truck during passing through the double solid line road section. If the vehicle catches up with the truck during passing through the double solid line road section, it is determined that the truck will affect passing of the vehicle through the double solid line road section. Therefore, the lane corresponding to the next recommendation priority is selected as the alternative lane, and the step of determining whether a truck exits on the alternative lane continues to be performed.

In step 415, the alternative lane is determined as the recommended lane when a truck exists on the alternative lane and the truck does not affect passing of the vehicle through the double solid line road section or when no truck exists on the alternative lane.

In this step, when a truck exists on the alternative lane, it is determined, based on location information of the truck and a speed thereof, whether the vehicle will catch up with the truck during passing through the double solid line road section. If the vehicle cannot catch up with the truck during passing through the double solid line road section, it is determined that the truck will not affect passing of the vehicle through the double solid line road section. Therefore, determining the alternative lane as the recommended lane does not affect vehicle following experience of the user.

In this step, the alternative lane may be directly used as the recommended lane when no truck exists on the alternative lane.

In step 416, the lane with the highest recommendation priority is used as the recommended lane when a truck exists on each of the lanes and the truck affects passing of the vehicle through the double solid line road section.

In this step, the lane with the highest recommendation priority is directly used as the recommended lane when a truck exists on each of the lanes and the truck affects passing of the vehicle through the double solid line road section, so that the vehicle can safely pass the double solid line road section as soon as possible.

In the foregoing specific implementations, the recommended lane is determined based on the recommendation priorities of the lanes, whether a truck travels on each of the lanes, and whether the truck affects passing of the vehicle through the double solid line road section. In this way, traffic efficiency can be ensured as much as possible when vehicle following feeling of the driver is given priority, so that the vehicle can safely pass through the double solid line road section as soon as possible.

During practical application, different weights may be set for different vehicle types. For example, a higher weight may be set for a car and a lower weight may be set for a truck. Therefore, when a recommended lane is planned, vehicle following concerns of the driver about different types of vehicles can be taken into account, thereby planning the recommended lane that meets a psychological expectation of the driver.

Figure 2:
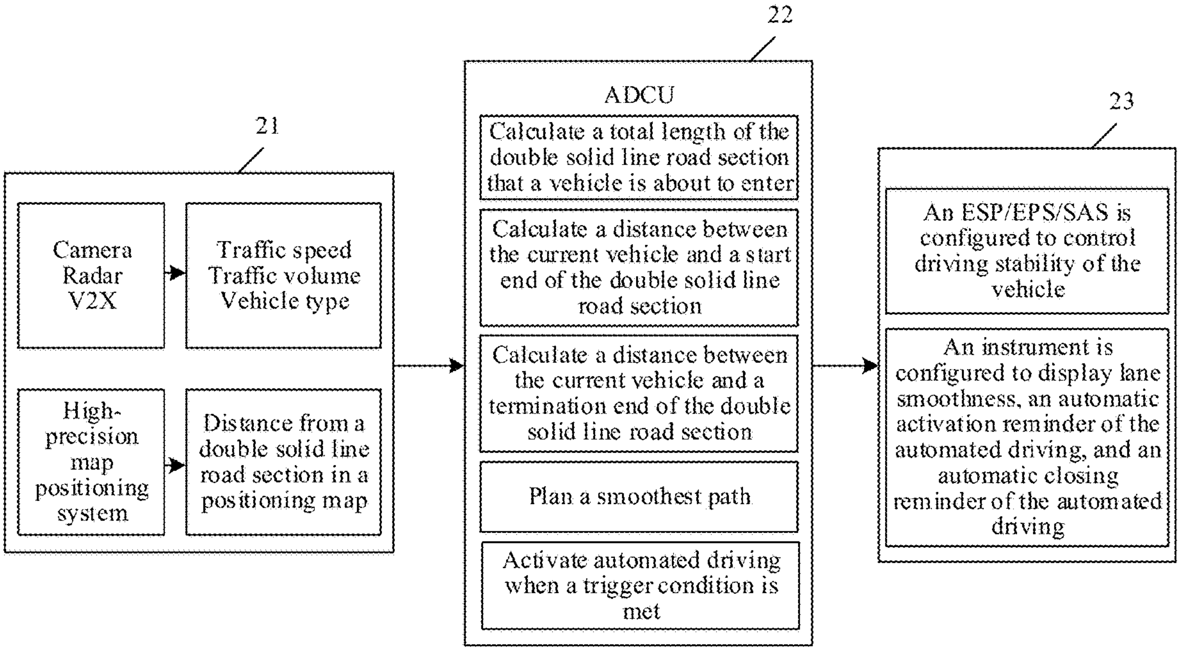
FIG. 2 is a structural diagram of a system configured to implement a vehicle control method according to an example of the present disclosure.

FIG. 2 is a structural diagram of a system configured to implement a vehicle control method according to an example of the present disclosure.

As shown in FIG. 2, the vehicle control method according to this example of the present disclosure is jointly implemented by an input module 21, a control module 22, and an execution module 20.

The input module 21 includes a camera, a radar, a V2X communication module, a high-precision map, and a high-precision positioning module. Traffic speeds, traffic volumes, and vehicle types of lanes may be determined through the camera, the radar and the V2X. A distance from a double solid line road section is determined through the camera or the high-precision map and the high-precision positioning module.

The control module 22 includes an ADCU, configured to: calculate a total length of the double solid line road section that a vehicle is about to enter; calculate a distance between the current vehicle and a start end of the double solid line road section; calculate a distance between the current vehicle and a termination end of the double solid line road section; determine, when the total length of the double solid line road section reaches a third length threshold, smoothness and the traffic speeds of the lanes ahead of the vehicle, and plan a smoothest path; and activate automated driving when a trigger condition that the vehicle has entered the double solid line road section is met.

The execution module 23 includes a vehicle electric stability program (ESP), an electric power steering (EPS) system, a steering wheel angle sensor (SAS), and an instrument.

The ESP, the EPS, and the SAS are configured to control driving stability of the vehicle, and the instrument is configured to display lane smoothness, an automatic activation reminder of the automated driving, and an automatic closing reminder of the automated driving.

Figure 3:
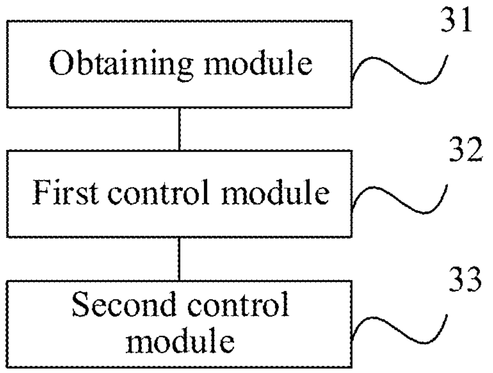
FIG. 3 is a schematic diagram of a vehicle control apparatus according to an example of the present disclosure.

FIG. 3 is a schematic diagram of a vehicle control apparatus according to an example of the present disclosure. The apparatus includes:

- an obtaining module 31, configured to obtain road condition information ahead of a vehicle;
- a first control module 32, configured to control, when determining, based on the road condition information, that the vehicle has entered a double solid line road section, the vehicle to perform automated driving; and
- a second control module 33, configured to control, when determining, based on the road condition information, that the vehicle has exited the double solid line road section, the vehicle to exit automated driving.

In an example, the obtaining module 31 includes:

- a first identification unit, configured to determine the double solid line road section ahead of the vehicle based on high-precision map information and positioning information when an area ahead of the vehicle is a high-precision map coverage area; and
- a second identification unit, configured to identify, when the area ahead of the vehicle is a non-high-precision map coverage area, the double solid line road section based on a picture of the area ahead of the vehicle captured by a camera.

In an example, the first control module 32 includes:

- a first determining unit, configured to determine, when a distance between a start end of the double solid line road section and the vehicle is less than or equal to a first length threshold, that the vehicle has entered the double solid line road section.

The second control module 33 includes:

- a second determining unit, configured to determine, when a distance between a termination end of the double solid line road section and the vehicle is less than or equal to a second length threshold, that the vehicle has exited the double solid line road section.

In an example, the first control module 32 further includes:

- a third determining unit, configured to determine a length of the double solid line road section in the area ahead of the vehicle when the area ahead of the vehicle is the high-precision map coverage area and before it is determined that the distance between the start end of the double solid line road section and the vehicle is less than or equal to the first length threshold; and
- an execution unit, configured to perform, when the length of the double solid line road section is greater than or equal to a third length threshold, a step of determining that the distance between the start end of the double solid line road section and the vehicle is less than or equal to the first length threshold.

In an example, the first control module 32 further includes:

- a fourth determining unit, configured to determine a recommended lane among lanes; and
- a first prompt unit, configured to display first prompt information, the first prompt information being used for guiding a driver to drive to the recommended lane.

In an example, in the apparatus, the fourth determining unit includes:

- an identification subunit, configured to identify vehicle types, vehicle speeds, and location information of other vehicles on the lanes ahead of the vehicle; and
- a determining subunit, configured to determine the recommended lane among the lanes based on the vehicle types, the vehicle speeds, and the location information of the other vehicles.

In an example, the determining subunit is specifically configured to determine recommendation priorities of the lanes based on traffic volumes and average passing speeds. A lane with a highest recommendation priority among the lanes is used as an alternative lane. Whether a truck exists on the alternative lane is determined based on the vehicle types. When a truck exists on the alternative lane and the truck affects passing of the vehicle through the double solid line road section, a lane corresponding to a next recommendation priority is used as the alternative lane, and a step of determining whether a truck exists on the alternative lane based on the vehicle types is performed; the alternative lane is determined as the recommended lane when a truck exists on the alternative lane and the truck does not affect passing of the vehicle through the double solid line road section or when no truck exists on the alternative lane; or the lane with the highest recommendation priority is used as the recommended lane when a truck exists on each of the lanes and the truck affects passing of the vehicle through the double solid line road section.

In an example, the second control module 33 further includes:

- a second prompt unit, configured to display second prompt information before the vehicle is controlled to exit automated driving, the second prompt information being used for prompting the driver to take over the vehicle.

In an example, the first control module 33 is specifically configured to control, when determining, based on the road condition information, that the vehicle has entered a double solid line road section, the vehicle to perform vehicle following or cruising.

An example of the present disclosure provides a vehicle, including the vehicle control apparatus described above.

The apparatus and vehicle examples are basically similar to the vehicle control method examples, and therefore, reference may be made to a part of description of the method examples for related content.

Based on the vehicle control apparatus and the vehicle according to this example of the present disclosure, road condition information ahead of a vehicle is obtained; and when it is determined, based on the road condition information, that the vehicle has entered a double solid line road section, the vehicle is controlled to perform automated driving; or when it is determined that the vehicle has exited the double solid line road section, the vehicle is controlled to perform automated driving. In this example of the present disclosure, it is only necessary to determine, based on the road condition information, that the vehicle has entered the double solid line road section. That is, the vehicle is triggered to perform an automated driving function, and does not rely on setting of a navigation route. A driver is restricted from controlling the vehicle in the double solid line road section, and the vehicle is controlled to start automated driving in this case. This can allow the driver to have a rest while ensuring driving safety. Therefore, this example of the present disclosure can effectively solve a problem that current automated driving requires a user to perform route planning in advance, which is likely to bring inconvenience to the user.

Figure 4:
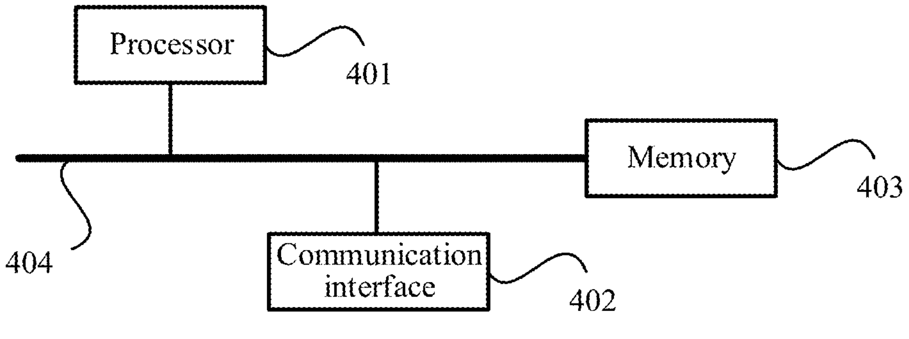
FIG. 4 is a block diagram of an electronic device according to an example of the present disclosure.

An example of the present disclosure also provides an electronic device, as shown in FIG. 4, including a processor 401, a communication interface 402, a memory 403, and a communication bus 404. The processor 401, the communication interface 402, and the memory 403 complete communication with each other through the communication bus 404.

The memory 403 is configured to store a computer program.

The processor 401 is configured to implement the following steps when executing the program stored in the memory 403.

Road condition information ahead of a vehicle is obtained.

When it is determined, based on the road condition information, that the vehicle has entered a double solid line road section, the vehicle is controlled to perform automated driving.

When it is determined, based on the road condition information, that the vehicle has exited the double solid line road section, the vehicle is controlled to exit automated driving.

The processor 401 may be further configured to implement other steps in the foregoing vehicle control method. Details are not described herein again.

The communication bus included in the electronic device may be a peripheral component interconnect (PCI) bus, an extended industry standard architecture (EISA) bus, or the like. The communication bus may be classified as an address bus, a data bus, a control bus, or the like. For ease of representation, only one bold line is used to represent the communication bus in the figure, but this does not mean that there is only one bus or only one type of bus.

The communication interface is used for communication between the electronic device and another device.

The memory may include a random access memory (RAM), or may further include a non-volatile memory, for example, at least one magnetic disk storage. Optionally, the memory may be at least one storage apparatus located remotely from the processor.

The processor may be a general-purpose processor, including a central processing unit (CPU), a network processor (NP), and the like; or may be a digital signal processor (digital signal processor, DSP), an application-specific integrated circuit (ASIC), a field programmable gate array (FPGA) or another programmable logic device, a discrete gate or a transistor logic device, a discrete hardware component, or the like.

Another example of the present disclosure further provides a computer-readable storage medium, including instructions. When the instructions are run on a computer, the computer is caused to perform the vehicle control method in the foregoing examples.

Still another example of the present disclosure further provides a computer program product including instructions. When the computer program product runs on a computer, the computer is caused to perform the vehicle control method in the foregoing examples.

A part or all of the foregoing examples may be implemented by software, hardware, firmware, or any combination thereof. When the software is used to implement the examples, a part or all of the examples may be implemented in a form of a computer program product. The computer program product includes one or more computer instructions. When the computer program instructions are loaded and executed on the computer, the procedures or functions according to examples of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state disk (SSD), or the like.

It should be noted that, the relational terms such as first and second in this specification are used only to differentiate an entity or operation from another entity or operation, and do not require or imply any actual relationship or sequence between these entities or operations. Moreover, the terms "include," "comprise," and any variation thereof are intended to cover a non-exclusive inclusion. Therefore, in the context of a process, a method, an object, or a device that includes a series of elements, the process, method, object, or device not only includes such elements, but also includes other elements not specified expressly, or may include inherent elements of the process, method, object, or device. Without more limitations, an element defined by the sentence "include a/an . . . " does not exclude that there are still other same elements in the process, the method, the object, or the device that includes the element.

The examples in this specification are all described in a related manner. For same or similar parts in the examples, mutual reference may be made, and description of each example focuses on a difference from other examples. Examples of the apparatus, the electronic device, the computer-readable storage medium, and the computer program product including instructions thereof are substantially similar to the method examples, and therefore, are briefly described, and reference may be made to a part of description of the method examples.

The foregoing description is merely preferred examples of the present disclosure, and is not intended to limit the protection scope of the present disclosure. Any modification, equivalent replacement, or improvement made without departing from the spirit and principle of the present disclosure shall fall within the protection scope of the present disclosure.

What is claimed is:

1. A vehicle control method, comprising:

obtaining road condition information ahead of a vehicle; and controlling, in response to determining, based on the road condition information, that the vehicle has entered a double solid line road section, the vehicle to perform automated driving; and controlling, in response to determining, based on the road condition information, that the vehicle has exited the double solid line road section, the vehicle to exit automated driving, wherein the determining, based on the road condition information, that the vehicle has entered a double solid line road section comprises:

determining, in response to a distance between a start end of the double solid line road section and the vehicle being less than or equal to a first length threshold, that the vehicle has entered the double solid line road section; and the determining, based on the road condition information, that the vehicle has exited the double solid line road section comprises;

determining, in response to a distance between a termination end of the double solid line road section and the vehicle being less than or equal to a second length threshold, that the vehicle has exited the double solid line road section.

2. The vehicle control method according to claim 1, wherein the obtaining road condition information ahead of a vehicle comprises:

determining the double solid line road section ahead of the vehicle based on high-precision map information and positioning information when an area ahead of the vehicle is a high-precision map coverage area; and identifying, when the area ahead of the vehicle is a non-high-precision map coverage area, the double solid line road section based on a picture of the area ahead of the vehicle captured by a camera.

3. The vehicle control method according to claim 2, wherein when the area ahead of the vehicle is the high-precision map coverage area and before it is determined that the distance between the start end of the double solid line road section and the vehicle is less than or equal to the first length threshold, the method further comprises:

determining a length of the double solid line road section in the area ahead of the vehicle; and performing, when the length of the double solid line road section is greater than or equal to a third length threshold, a step of determining that the distance between the start end of the double solid line road section and the vehicle is less than or equal to the first length threshold.

4. The vehicle control method according to claim 1, wherein before the controlling the vehicle to perform automated driving, the method further comprises:

determining a recommended lane among lanes; and displaying first prompt information, the first prompt information being used for guiding a driver to drive to the recommended lane.

5. The vehicle control method according to claim 4, wherein the determining a recommended lane among lanes comprises:

identifying vehicle types, vehicle speeds, and location information of other vehicles on the lanes and ahead of the vehicle;

calculating traffic volumes and average passing speeds of the lanes based on the vehicle speeds and the location information of the other vehicles; and determining the recommended lane among the lanes based on the vehicle types, the traffic volumes, and the average passing speeds.

6. The vehicle control method according to claim 5, wherein the determining the recommended lane among the lanes based on the vehicle types, the traffic volumes, and the average passing speeds comprises:

determining recommendation priorities of the lanes based on the traffic volumes and the average passing speeds;

using a lane with a highest recommendation priority among the lanes as an alternative lane;

determining whether a truck exists on the alternative lane based on the vehicle types; and using, when a truck exists on the alternative lane and the truck affects passing of the vehicle through the double solid line road section, a lane corresponding to a next recommendation priority as the alternative lane, and performing determining whether a truck exists on the alternative lane based on the vehicle types;

determining the alternative lane as the recommended lane when a truck exists on the alternative lane and the truck does not affect passing of the vehicle through the double solid line road section or when no truck exists on the alternative lane; or using the lane with the highest recommendation priority as the recommended lane when a truck exists on each of the lanes and the truck existing on each of the lanes affects passing of the vehicle through the double solid line road section.

7. The vehicle control method according to claim 1, wherein before the controlling the vehicle to exit automated driving, the method further comprises:

displaying second prompt information, the second prompt information being used for prompting the driver to take over the vehicle.

8. The vehicle control method according to claim 1, wherein the controlling the vehicle to perform automated driving comprises:

controlling the vehicle to perform vehicle following or cruising.

9. An electronic device, comprising: a processor, a communication interface, a memory, and a communication bus, the processor, the communication interface, and the memory completing communication with each other through the communication bus;

the memory being configured to store a computer program; and when executing the program stored in the memory, the processor being configured to perform:

obtaining road condition information ahead of a vehicle; and controlling, in response to determining, based on the road condition information, that the vehicle has entered a double solid line road section, the vehicle to perform automated driving; and controlling, in response to determining, based on the road condition information, that the vehicle has exited the double solid line road section, the vehicle to exit automated driving, wherein the determining, based on the road condition information, that the vehicle has entered a double solid line road section comprises:

determining, in response to a distance between a start end of the double solid line road section and the vehicle being less than or equal to a first length threshold, that the vehicle has entered the double solid line road section; and the determining, based on the road condition information, that the vehicle has exited the double solid line road section comprises:

determining, in response to a distance between a termination end of the double solid line road section and the vehicle being less than or equal to a second length threshold, that the vehicle has exited the double solid line road section.

10. The electronic device according to claim 9, wherein the obtaining road condition information ahead of a vehicle comprises:

determining the double solid line road section ahead of the vehicle based on high-precision map information and positioning information when an area ahead of the vehicle is a high-precision map coverage area; and identifying, when the area ahead of the vehicle is a non-high-precision map coverage area, the double solid line road section based on a picture of the area ahead of the vehicle captured by a camera.

11. A vehicle, comprising the electronic device according to claim 9.

12. A non-transitory computer-readable storage medium, storing a computer program for, when the program is executed by a processor, implementing a vehicle control method, the method comprising:

obtaining road condition information ahead of a vehicle; and controlling, in response to determining, based on the road condition information, that the vehicle has entered a double solid line road section, the vehicle to perform automated driving; and controlling, in response to determining, based on the road condition information, that the vehicle has exited the double solid line road section, the vehicle to exit automated driving, wherein the determining, based on the road condition information, that the vehicle has entered a double solid line road section comprises:

determining, in response to a distance between a start end of the double solid line road section and the vehicle being less than or equal to a first length threshold, that the vehicle has entered the double solid line road section; and the determining, based on the road condition information, that the vehicle has exited the double solid line road section comprises:

determining, in response to a distance between a termination end of the double solid line road section and the vehicle being less than or equal to a second length threshold, that the vehicle has exited the double solid line road section.

13. The non-transitory computer-readable storage medium according to claim 12, wherein the obtaining road condition information ahead of a vehicle comprises:

determining the double solid line road section ahead of the vehicle based on high-precision map information and positioning information when an area ahead of the vehicle is a high-precision map coverage area; and identifying, when the area ahead of the vehicle is a non-high-precision map coverage area, the double solid line road section based on a picture of the area ahead of the vehicle captured by a camera.

* * * * *